United States Patent [19]

Rüssemeyer et al.

[11] Patent Number: 4,599,017
[45] Date of Patent: Jul. 8, 1986

[54] METHOD OF AND DEVICE FOR AUTOMATIC CHARGING A PLURALITY OF RECEIVING STATIONS WITH PULVERIZED MATERIAL

[75] Inventors: Hans Rüssemeyer, Walle; Karl-Heinz Pollak; Gerhard Hoffmann, both of Braunschweig, all of Fed. Rep. of Germany

[73] Assignee: Bühler-Miag GmbH, Braunschweig, Fed. Rep. of Germany

[21] Appl. No.: 588,133

[22] Filed: Mar. 8, 1984

[30] Foreign Application Priority Data

Mar. 23, 1983 [DE] Fed. Rep. of Germany ....... 3310452

[51] Int. Cl.$^4$ .............................................. B65G 53/06
[52] U.S. Cl. ....................................... 406/95; 406/156
[58] Field of Search ......................... 406/95, 106, 156

[56] References Cited

U.S. PATENT DOCUMENTS

| | | | |
|---|---|---|---|
| 1,465,269 | 8/1923 | Horn et al. | 406/95 X |
| 2,580,581 | 1/1952 | Niemitz | 406/156 |
| 3,311,418 | 3/1967 | Scruby et al. | 406/156 X |
| 3,929,379 | 12/1975 | Krambrock | 406/95 |
| 4,491,442 | 1/1985 | Stelter et al. | 406/95 |

FOREIGN PATENT DOCUMENTS

| | | |
|---|---|---|
| 2022962 | 9/1974 | Fed. Rep. of Germany . |
| 2657677 | 3/1979 | Fed. Rep. of Germany . |
| 871651 | 6/1961 | United Kingdom ............... 406/106 |

Primary Examiner—Jeffrey V. Nase
Attorney, Agent, or Firm—Michael J. Striker

[57] ABSTRACT

A plurality of receiving stations is automatically and pneumatically charged by a pulverized or granular material fed at a relatively low rate through a main conveying pipe into a plurality of series connected intermediate containers. Each intermediate container is connected with a substantially horizontally directed branch conduit which is provided with downwardly directed discharge or sink pipes opening into a preliminary storage hopper of a corresponding receiving station. Each branch conduit is connected via unidirectional valves or via throttles with an auxiliary pneumatic line which when the end of the sink pipe is open, fluidizes the material in the branch conduit and simultaneously discharges it into the preliminary hopper. As soon as the level of charge in the hopper reaches the open end of the sink pipe, the fluidization is interrupted and the loose material from the intermediate container plugs the branch conduit. Only after the level of discharge in the hopper drops below the open ends of the sink pipes, the fluidization and discharge is restarted.

8 Claims, 3 Drawing Figures

METHOD OF AND DEVICE FOR AUTOMATIC CHARGING A PLURALITY OF RECEIVING STATIONS WITH PULVERIZED MATERIAL

BACKGROUND OF THE INVENTION

The present invention relates to a method and to a device for automatic pneumatic charging of a plurality of receiving stations each provided with a preliminary storing bin, with a pulverized or granulated material.

In plant technology it is frequently required to charge substantially simultaneously a large number of receiving stations spaced apart from each other at certain intervals, with pulverized or granulated material. For example an aluminum producing plant which has a large number of premises for processing raw aluminum oxide, it is necessary due to the relatively low capacity of the furnaces to charge the latter in more or less regular time intervals. Such furnaces are arranged in the so-called furnace house in rows of 25 furnaces each and the total number of such furnaces may amount up to 150.

A prior art method of charging such furnaces is based on providing each furnace with a preliminary hopper acting as a buffer container and supplying aluminum oxide in each hopper by means of charging vehicles. Since each furnace consumes about 100 kg. of aluminum oxide per hour such prior art method necessitates a large number of attaining personal and moreover it is very noisy, causes air pollution in the entire plant and is prone to work accidents.

In another known solution of the beforementioned problem the granulated or pulverized material is transported mechanically by means of worm conveyors or pneumatically by means of pneumatic conveyors. Current pneumatic conveying systems for this purpose, however, are very costly due to the multitude of pipe branches, pipe switching points and material shutoff elements such as flaps or the like, and also the operation and maintenance of such complicated transportation systems becomes rather expensive because the conveyed material, such as alumin oxide is very abrasive and makes the transportation unreliable due to the wear in the conveying lines, resulting in frequent dead times and a considerable expenditures for the repair work and spare parts.

SUMMARY OF THE INVENTION

It is therefore a general object of the present invention to overcome the aforementioned disadvantages.

More particularly, it is an object of the invention to provide an improved method of an automatic pneumatic charging a plurality of receiving stations with pulverized or granulated material, which is free of noise and pollution.

Another object of this invention is to provide such an improved method which automatically supplies the material to respective receiving stations according momentary consumption requirements.

A further object of the invention is to provide such an improved method which almost completely eliminates expensive pipe branches, pipe switch points and shutoff valves which are normally subject to wear and prone to failure and hence improves the operational reliability and decreases maintenance cost in transporting pulverized and granulated material of most diversified kind.

In keeping with these objects and others which will become apparent hereafter, one feature of the invention resides in a combination in which the material to be charged in large number of different receiving stations is pneumatically conveyed by a main conveying line to consecutive intermediate containers assigned to respective receiving stations, and from the intermediate conveyors the material is tapped-off into pneumatically controlled branch conduits each having at least one outlet opening into a preliminary hopper of a corresponding receiving station. The outlet of the branch conduit is first automatically plugged against the pneumatic pressure in the main conveying line and after the branch conduit is filled up with loose material a unidirectional pneumatic control valve is lifted and the material is fluidized so that it is fed substantially without pressure into the underlying preliminary hopper until a predetermined level of material in the hopper is reached. At this point the pneumatic control valve closes and the outlet of the branch conduit is plugged. When the filling of material in the preliminary hopper drops below the predetermined level, the pneumatic control valve again automatically opens and the replenishing process of the preliminary hopper is restarted.

The gist of this invention is the split up of the material conveying process into the particular slow acting main conveying line which cooperates with respective branch lines responsive to the filling condition in each receiving station so that the material supplied from the main line is further conveyed in fluidized state or alternatively, it becomes automatically plugged when the preliminary hopper assigned to the receiving station has reached a predetermined filling level.

As it will be explained below, the plugging capacity of the pulverized material is intentionally used for the automatic pneumatic control of the charge or discharge in the branch conduit. A substantial advantage of the method of this invention is to be seen in the fact that only minute quantities of conveying pressure medium are wasted at the outlet from the branch conduit to the preliminary hopper and consequently no aspiration occurs and no filters are necessary.

In a preferred further elaboration of this invention, after the completion of the flow of material in the intermediate conveyors in the main conveying line, a small residual pressure for assisting the discharge of the material from the branch conduits is preserved. For this purpose, a relatively minute pressure is sufficient and it is pumped in the closed pneumatic system including the main conveying line, the intermediate conveyors and an auxiliary pneumatic line cooperating with the branch conduits so as to achieve the subsequent fluidization of the material in the branch conduits. If designing the intermediate conveyors with a sufficient height, this effect can be achieved even by static pressure of the material in the intermediate container.

In the preferred embodiments of the device for performing the method of this invention, a conventional arrangement of a main pneumatic conveying line supplied with pressure air via unidirectional valves from an accompanying pressure gas conduit, communicates with succession of charging units, each including the intermediate container connected to the main conveying line and communicating with a branch conduit whose outlet opens into a preliminary hopper which is directed to the assigned receiving station. The branch conduit is connected via a plurality of shut-off and/or unidirectional valves and filters with the auxiliary pneumatic line which supplies pressure fluid in dependency on the filling condition in the preliminary hopper. The intermediate containers have a bag-like shape and in intervals enlarge the cross-section of the main conveying conduit.

The combination according to this invention employs as an element the slow conveyor disclosed for example in prior art German publications DE-PS No. 2,657,677 or DE-AS No. 2,002,962. The prior art modification, however, has the main conveying line periodically extended in cross-section at the locations of the intermediate containers. A similar design has also a branch conduits which, however, communicate with the assigned intermediate containers without the use of shutoff elements and serving for discharging the contained material by fluidization. The number of outlets of each branch conduit depends on the particularities of the corresponding receiving station. If a larger number of feed in outlets are present so it is recommended to devide a preliminary hopper into a corresponding number of chambers each cooperating with an assigned outlet end of the branch conduit. The outlets of the branch conduit are preferably in the form of sink pipes opening at a predetermined level within the preliminary hopper so that a self-regulating effect of the fluidization of the supplied material is achieved inasmuch when the filling level of the material in the hopper reaches the ends of the outlet pipes, the resulting overpressure in the branch conduit closes the one-way valves, the fludization of material in the branch conduit is interrupted, the material plugs the outlets and the discharge in the preliminary hopper is stopped. Only after the level of material in the hopper drops below the ends of the sink pipes, pressure from the auxiliary pneumatic line lifts the closing elements in the one way valves, and fluidizes the material in the branch conduit so that replenishing of the charge is automatically restarted.

In a further advantageous elaboration of this invention, the auxiliary pneumatic line for the individual branch conduits is a separate line independent from the pressure medium line for the main conveying pipe. This arrangement has the advantage that the fluidizing process can be better controlled in time and pressure conditions in all branch conduits can be made more uniform.

In another advantageous embodiment of this invention the auxiliary pneumatic line for each branch conduit is provided with individually activated shutoff elements. The advantage of this measure is the possibility to control, for example, from a central control room the individual loads in the preliminary hoppers or the charges in the receiving station so that when needed selected receiving stations can be disconnected.

Finally, a substantially advantageous feature of this invention is the provision of shutoff elements at the beginning and at the end of the main conveying line which enables the blocking of the latter when the supply of material in the intermediate containers is completed. This measure insures that a residual pressure in the main conveying line and in the intermediate containers is preserved to assist the flow of loose material in the branch conduits. By the shutoff elements at the beginning and at the end of the main conduit a large storing container for the loose material and a pressure medium container are disconnected from the main conveying line so that the residual pressure in the latter is supplied exclusively from the parallel pressure medium supply conduit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
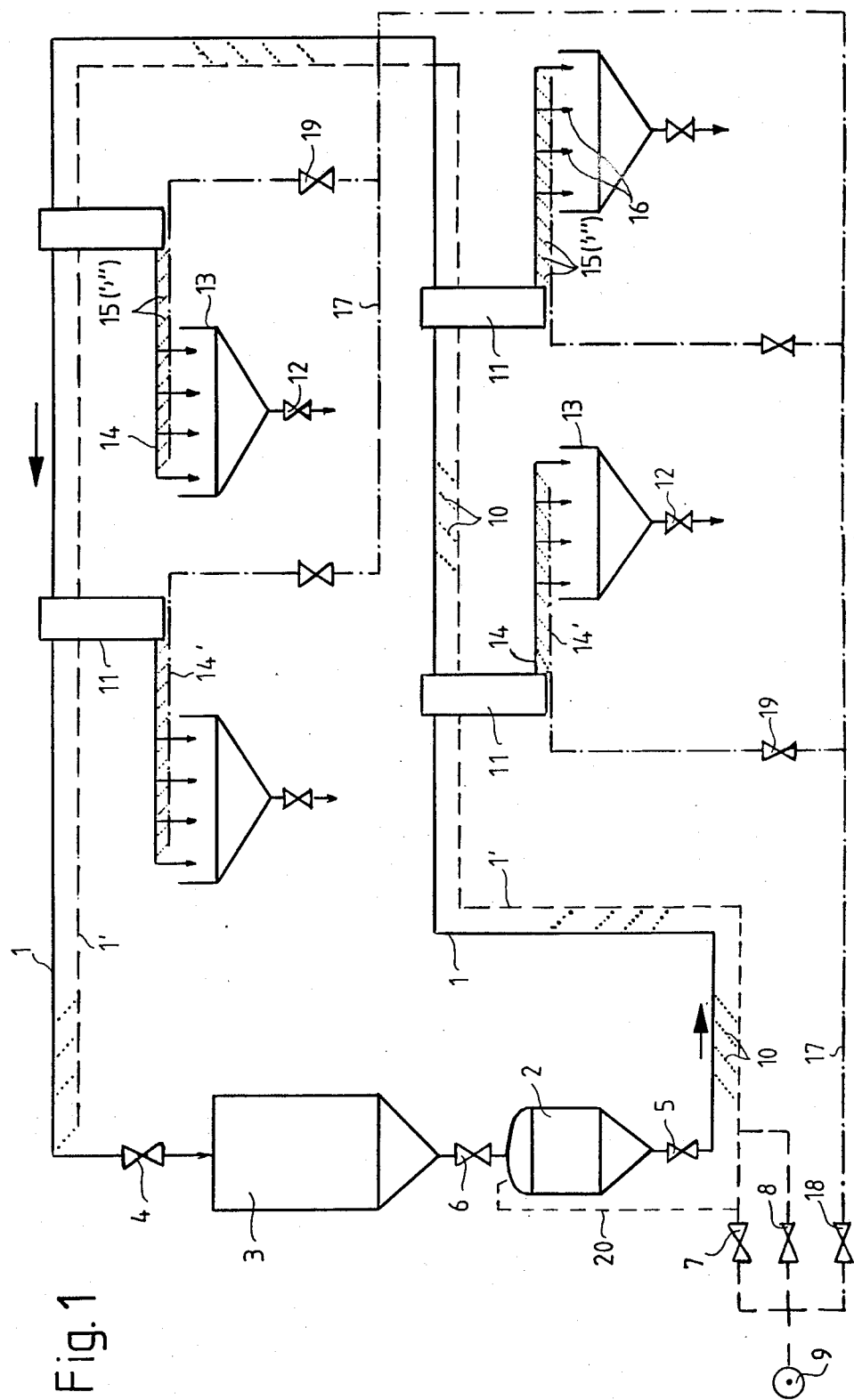
FIG. 1 is a simplified circuit diagram of the device of this invention.

In FIG. 1, a pneumatic main conveying line 1 for a loose material leads from a pressure medium container 2 past a succession of non-illustrated receiving stations situated opposite shutoff valves 12 and terminate in a large silo or storage container 3 for pulverized or granulated material to be distributed in the receiving stations. The silo is connected to pressure medium container 2 via a shutoff valve 6. Shutoff valves 4 and 5 at the end and at the beginning of the main conveying line 1 selectively separate line 1 from the storage and pressure medium containers, whereas shutoff valve 6 controls the flow of pulverized material from the silo 3 in the pressure medium container 2.

Figure 2:
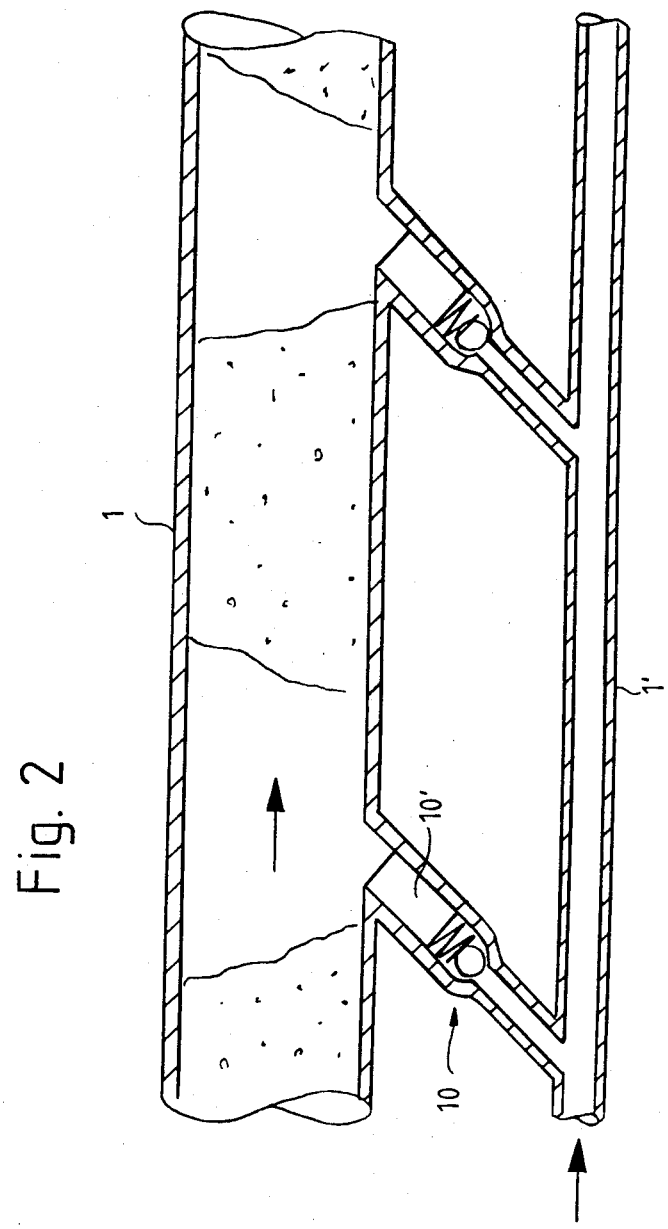
FIG. 2 is a sectional view of a cut-away portion of the main conveying line in the device of FIG. 1, shown on an enlarged scale.

Parallel to the main conveying line 1 extends a pressure medium supply line 1' indicated by dashed line which is connected via shutoff valve 7 and 8 to a source of pressure medium 9 which is usually a pressure air generator. Shutoff valve 7 controls the flow of pressure medium in the container 2. Along the entire length of the main conveying line 1, there are provided a large number of one-way valves 10, connected to the pressure medium supply conduit 1' and being oriented in the direction of flow of the transported material. The one-way valves 10 are preferably in the form of ball valves. Referring to FIG. 2, the ball valves are connected with gas permeable blocking elements 10' which prevent the passage of the pulverized material from the main conduit 1 to the seats of the ball valves 10 and to the pressure medium supply conduit 1'.

Figure 3:
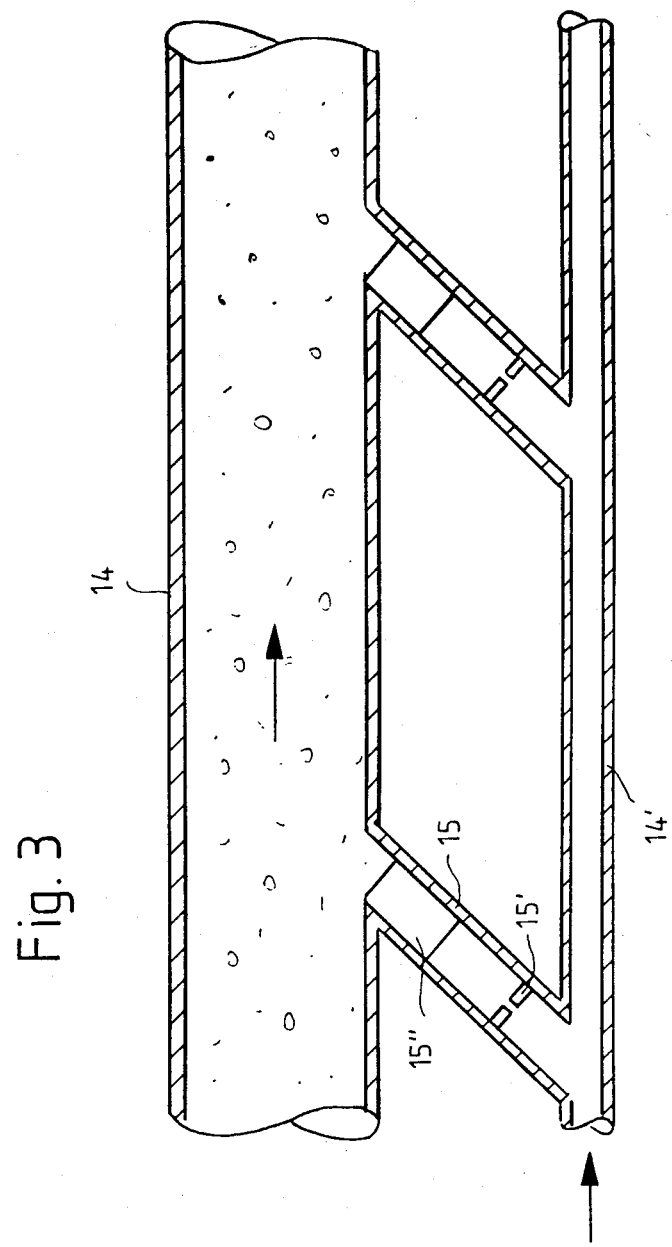
FIG. 3 is a sectional view of a cut-away portion of a branched conduit in the device of FIG. 1 also shown on an enlarged scale.

At the locations of the receiving stations, the main conveying conduit 1 opens into an upper part of an intermediate container 11 whose cross-section is extended with respect to that of the main conduit so that in the advance of the pulverized or granulated material in the direction indicated by arrow, the containers 11 are filled up with the material to provide an intermediate storage of the latter. The parallel pressure medium supply container 1', as mentioned before, communicates with the interior of the intermediate containers via the one way valves. The bottom part of each intermediate container 11 is connected with a branch conduit 14 which is located above a preliminary storage hopper 13 and communicating via a shutoff valve 12 with a nonillustrated receiving station. The branch conduit 14 at the bottom of each intermediate container cooperates also with an auxiliary pneumatic line 14' (FIG. 3) which extends along the entire length of the respective branch conduits. Between the branch conduit 14 and the auxiliary pneumatic line 14', there are provided numerous transit pipes 15 each equipped with a throttle 15' in the form of an apertured diaphragm for example and/or with a one-way valve similar to that as illustrated in FIG. 2. Above the throttles or one-way valves 15' there is also provided a gas permeable blocking element or filter 15" which prevents the pulverized material from entering the auxiliary pneumatic line. The branch conduit 14 is formed with a plurality of downwardly directed outlet pipes 16 whose open ends project into the interior of the preliminary hopper 13. In this example each branch conduit has four outlet pipes. It will be noted however that depending on local conditions another number of outlets can be realized. In this embodiment, the auxiliary pneumatic lines 14' are connected to a separate conduit 17 which is connected via a shutoff valve 18 to the source of pneumatic medium 9, independently from the pressure medium supply line 1' of the main conveying pipe. Another shutoff valve 19 is connected between each auxiliary pneumatic line 14' and the common supply line 17 so that charging of individual receiving stations can be individually controlled.

The operation of the circuit of this invention is as follows:

At first shutoff valves 5, 7, 8 and 18 are closed and shutoff valve 6 is opened in order to charge pressure medium container 2 with pulverized material from the silo 3. Thereafter the valve 6 is closed and valves 7 and 5 are opened so that pressure gas from source 9 flows through pressure conduit 20 in the upper part of the pressure container 2 and drives the loose material into the main conveying line 1. By the action of the conveying pressure in the container 2 as well as by auxiliary pneumatic streams from the pressure gas supply conduit 1', material in the main conduit 1 is relatively slowly transported through the latter and successively fills up the individual intermediate containers 11. At the same time, loose material at first enters initial range of the assigned branch conduit 14 and plugs the corresponding outlet pipe 16 (the auxiliary pressure lines 14' have not yet been activated), until all branch conduits 14 are filled up with the material. Excessive material from the main conveying pipe is returned via open shutoff valve 4 in the storage silo 3.

After all intermediate containers 7 and the corresponding branch conduits 14' have been filled up with loose material, the valves 4, 5 and 7 are closed, while valve 8 is opened so as to build up a relatively minute residual pressure in the main conveying pipe 1 and the intermediate containers 11. By opening shutoff valve 18 pressure medium is applied via conduit 17 and the auxiliary pneumatic lines 14' into individual branch conduits 14. As a result, pressure gas percollates through the transit pipes 15 and the throttles 15' and/or one-way valves and via filters 15" in the branch conduit 14 where it unplugs the inlets of the pipes 15 and fluidizes the pulverized material in the branch conduit. At the same time any plugging at the inlet of the branch conduit 14 is also removed and the residual pressure in the main conveying line 1 and in the intermediate container causes a continuous flow of loose material from the intermediate container 11 in the branch conduit 14 whereby the fluidized material can be discharged through respective sink pipes 16 into the preliminary hopper 13. As soon as the charge in the preliminary hopper reaches the level of the outlet ends of sink pipes 16, the resulting overpressure in the branch conduit 14 causes the valves 10 to close, the fluidization in the conduit 14 is interrupted and the discharge in the preliminary hoppers 13 is automatically stopped. When the level of the charge in the hopper falls below the outlet ends of the pipe 16, the discharging process is restarted in the manner described above so long as the fluidization in the conduits 14 takes place. When the intermediate containers 11 become empty or a short time before a complete discharge, the fluidization of the material is interrupted by closing the shutoff valve 18 and the slow conveying process in the main conveying line 8 is repeated in the before described manner until the intermediate containers 11 are replenished.

It will be understood that each of the elements described above, or two or more together, may also find a useful application in other types of constructions differing from the types described above.

While the invention has been illustrated and described as embodied in a specific example of a closed loop pneumatic conveying system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of automatic pneumatic charging of a plurality of receiving stations with pulverized or granular material, comprising the steps of pneumatically conveying a stream of the pulverized or granulated material into a plurality of consecutive intermediate storing spaces, then tapping-off the material from each intermediate storing space into a branch conduit provided with at least one sink pipe located above and opening into a preliminary hopper of the receiving station, then fluidizing the material in each branch conduit by auxiliary pressure medium and discharging substantially without pressure by gravity the fluidized material from each branch conduit into each preliminary hopper located under each at least one sink pipe, then automatically stopping the fluidization and discharge of the material from each branch conduit when the charge in its associated preliminary hopper reaches a predetermined level, and automatically restoring the fluidization and the discharge from each branch conduit when the charge in its associated preliminary hopper drops below that level.

2. A method as defined in claim 1, wherein after the completion of the transport of the pulverized or granular material in the intermediate containers a small residual pressure is established in the intermediate containers to assist in the flow of loose material in the branch conduits.

3. A method as defined in claim 2 wherein the fluidized material from each branch conduit is discharged substantially without pressure through at least one sink pipe opening at said predetermined level whereby the fluidization and discharge of the material is automatically controlled by the level of charge in each preliminary hopper.

4. A device for automatic pneumatic charging of a plurality of receiving stations, comprising storage means for a pulverized or granulated material, a source of pressure fluid, a main conveying line connected via shutoff means with the material storage means and with the source of pressure fluid to pneumatically convey said material in a feeding direction, a plurality of intermediate containers assigned to respective receiving stations and each having an upper portion communicating at consecutive locations with said main conveying line, a pressure fluid supply line accompanying the main conveying line and being connected via shut-off means with the source of pressure fluid and via a plurality of one-way valves with said main conveying line, a branch conduit communicating with a lower portion of each intermediate container and being provided with at least one sink pipe having an outlet, each at least one sink pipe being located above a preliminary storage hopper at each receiving station, and auxiliary pneumatic line connected to said source of pressure fluid and being connected to each branch conduit via a plurality of throttling or unidirectional valving means so as to fluidize the material in each branch conduit when the outlet of its at least one sink pipe is open and discharge the fluidized material through its at least one sink pipe substantially without pressure by gravity into the corresponding preliminary storage hopper located under its at least one sink pipe until the level of charge in the preliminary storage hopper reaches the outlet of that at least one sink pipe whereupon the residual pressure in the intermediate container plugs that branch conduit and stops the discharge and, after the charge in the preliminary storage hopper drops below the level of the outlet of that at least one sink pipe, the fluidizing process and the discharge of the material from that branch conduit is restarted.

5. A device as defined in claim 4, wherein each intermediate container has a bag-like shape of a cross-section which exceeds that of the main conveying pipe.

6. A device as defined in claim 4, wherein each auxiliary pneumatic line is provided with a plurality of branch lines extending parallel with respective branch conduits to supply via said throttling or unidirectional valving means pressue fluid into the latter.

7. A device as defined in claim 6, wherein each branch line of the auxiliary pneumatic line is provided with an individually operable shutoff element.

8. A device as defined in claim 3, wherein said source of pressure fluid is connected to said main conveying line via a pressure medium container, said pressure medium container is connected to said main conveying line via shutoff element and the end portion of the conveying line being connected with the material storage means via an additional shutoff element.

* * * * *